F. S. ELLETT.
FREE WHEEL DEVICE.
APPLICATION FILED APR. 28, 1917.

1,252,893.

Patented Jan. 8, 1918.

Witness
G. F. Baker

Inventor
Frederick S. Ellett
By M. Kent
Attorney

UNITED STATES PATENT OFFICE.

FREDERICK S. ELLETT, OF ELMIRA, NEW YORK.

FREE-WHEEL DEVICE.

1,252,893.  Specification of Letters Patent.  Patented Jan. 8, 1918.

Application filed April 28, 1917. Serial No. 165,150.

*To all whom it may concern:*

Be it known that I, FREDERICK S. ELLETT, a citizen of the United States, and resident of Elmira, county of Chemung, State of New York, have invented certain new and useful Improvements in Free-Wheel Devices, of which the following is a specification.

This invention relates to free wheel devices for motorcycles, bicycles and other machines.

It has for one of its objects the provision of a simple construction that will be inexpensive to manufacture and will also be thoroughly efficient and durable in operation.

A further object of the invention is to provide a device of the class mentioned which may be readily assembled or disassembled and the parts of which are normally so secured together as to retain their positions permanently during use.

A further object of the invention is to provide a device of the class mentioned, the working parts of which shall have an unusually high safety factor as regards wear, and be so thoroughly lubricated that the usual adjustments may be eliminated, a very compact design being thus provided which will permit the use of a smaller number of sprocket teeth than devices heretofore employed.

A further object is to provide a device of the class mentioned in which the driving stresses are diametrically opposed and the ball bearing relieved of undue crushing strains.

Other objects and the features of novelty will be apparent from the following description taken in connection with the accompanying drawings, in which, Figure 1 is a side elevation of a free wheel device embodying the invention, certain parts being broken away;

Figure 1:
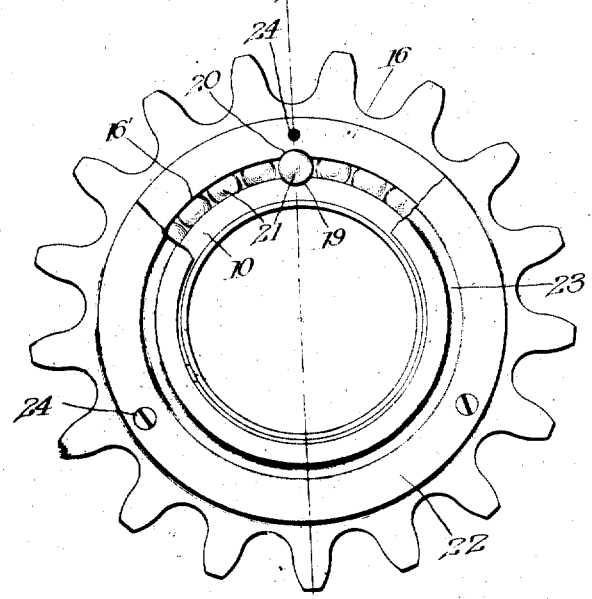
Figure 2:
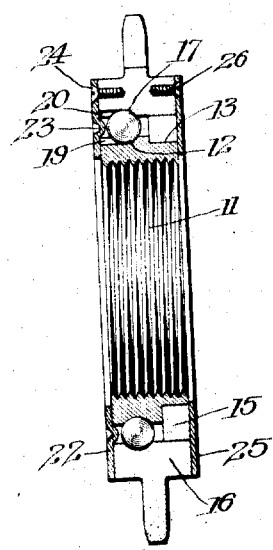
Fig. 2 is a longitudinal section on the line 2—2 of Fig. 1.

Referring to the drawings, 10 indicates an inner rotatable member which may be provided with a threaded bore 11 or which may otherwise be adapted to be secured on some rotating part. The member 10 has a substantially cylindrical outer surface in which there is arranged a ball race 12 at one side of the member. At the other side of the member there are circular recesses or seats 13 and 14 for the pawls 15, the pawls being adapted to rock in the recesses 13 and 14 for a purpose to be described hereinafter.

Coöperating with the member 10 is a member 16, concentric therewith and having a substantially cylindrical inner surface 16' provided with a ball race 17 which alines with the race 12 of the member 10. On the opposite side from the race 17, the member 16 has a series of internal ratchet teeth 18 with which the pawls 15 are adapted to coöperate. From the drawings it will be evident that the ratchet teeth 18 are wholly within the inner cylindrical surface of the member 15 so that these teeth may be readily formed by a cutting tool moving in an axial direction through the member. The recesses 13 are diametrically opposite and the same is true of the recesses 14 but the pair of recesses 13 is so positioned relatively to the pair 14 that but one pair of the pawls 15 is interlocked with ratchet teeth 18 at the same time, the other pair of pawls being preferably midway between successive ratchet teeth so that relative rotation of the parts through half the angular distance between successive ratchet teeth will bring into action said other pair of pawls.

The member 10 has a groove 19 and the member 16 has a similar groove 20 through which the balls 21 may be inserted when the members are in their normal relative positions.

Arranged on one side of the members is a plate 22 which closes the space between the members and is provided with an inwardly projecting portion 23 adapted to prevent the balls 21 from entering the grooves 19 and 20 when the parts are in operation. The plate 22 may be secured to the member 16 by screws 24. On the opposite side of the members is a plate 25 which may be secured to the member 16 by screws 26 and which serves to hold the pawls 15 in position and also close that side of the space between the members. The plates 22 and 25, therefore, serve to close the space between the members so that this space may be filled with grease or other lubricant and the same will be retained and thoroughly lubricate the balls 21 as well as the pawls 15.

In operation one pair of the pawls 15 normally constitutes a driving connection between the members when the member 16 is driven in the direction of the arrow in Fig.

Figure 3:
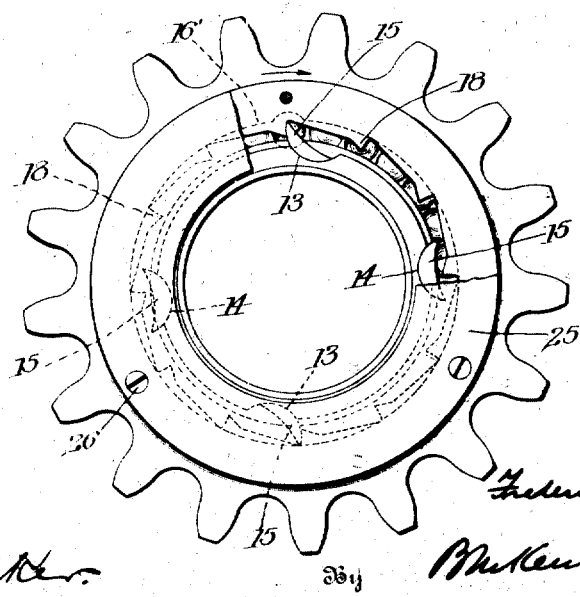
Fig. 3 is an elevation of the side opposite that shown in Fig. 1, certain parts being broken away.

8 or when the member 10 is driven in the opposite direction. As will be clearly seen from Fig. 3, the member 16 may rotate freely on the member 10 in the direction opposite to the arrow, the teeth 18 rocking the pawls 15 as they pass the latter, whereas relative movement of the members in the opposite sense would immediately effect a locking engagement of one pair of the pawls with the teeth 18. By spacing the pairs of pawls, as shown one or the other pair will come into action by a relative rotation of the members 10 and 16, not exceeding one half the angular distance between the ratchet teeth 18, thereby avoiding excessive shocks to the parts when the pawls interlock, with the teeth 18.

From the foregoing it will be evident that I have provided a very simple free wheel device which may be manufactured at a very low cost when produced in large quantities, the design lending itself to modern manufacturing methods. It will also be seen that the parts when assembled are thoroughly secured and the working parts lubricated so that by making the parts from the proper materials the device will not be subject to undue wear and adjustment of the ball bearing will be obviated.

Having described the invention what is claimed is:—

1. In a device of the class described, the combination of an inner rotatable member, an outer rotatable member, said members being arranged with an annular space between them extending from side to side thereof, bearing balls in said space, one or more pawls alongside of said balls in said space adapted to form a driving connection between said members, and removable means on opposite sides of said members closing the ends of said space.

2. In a device of the class described, the combination of an inner rotatable member having a substantially cylindrical outer surface formed adjacent one side of the member with a ball race, an outer rotatable member having a substantially cylindrical inner surface formed adjacent one side of the member with a ball race alining with the first mentioned race, a single row of balls in said races adapted to prevent relative axial movement of the members in either direction, said outer member being provided at its other side with internal teeth arranged wholly within the circle of its said cylindrical surface, and one or more pawls carried by said inner member in position to coact with said teeth.

3. In a device of the class described, the combination of an inner rotatable member having a substantially cylindrical outer surface formed with a ball race, an outer rotatable member having a substantially cylindrical inner surface formed with a ball race alining with the first mentioned race, balls in said races, said outer member being provided with internal teeth arranged wholly within the circle of its said cylindrical surface, one or more pawls carried by said inner member in position to coact with said teeth, and plates on the sides of said members closing the space therebetween.

4. In a device of the class described, the combination of two concentric rotatable members having alining ball races with ball entrance grooves extending to the sides of the members, balls in said races, coöperating pawls and ratchet teeth on said members adapted to form a driving connection therebetween, and a plate secured on the side of one of said members and provided with means to prevent said balls from escaping from said races into said grooves.

5. In a device of the class described, the combination of two concentric rotatable members provided with alined coöperating ball races and grooves extending from said races to the sides of said members, balls in said races, the parts being so constructed that said balls may be inserted or removed through said grooves when said members are in their normal relative positions, one of said members having ratchet teeth on the opposite side from said groove, the other member carrying pawls coacting with said teeth and adapted to be removed or inserted from said opposite side when said members are in the normal relative positions, and retaining plates for said balls and pawls detachably secured against the sides of said members.

In testimony whereof I affix my signature.

FREDERICK S. ELLETT.